(No Model.)
T. A. EDISON.
DYNAMO OR MAGNETO ELECTRIC MACHINE.
No. 281,353. Patented July 17, 1883.
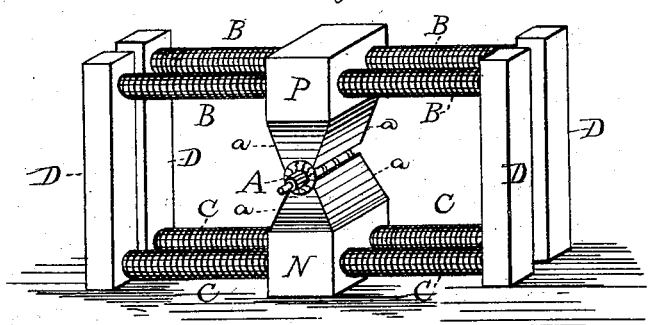
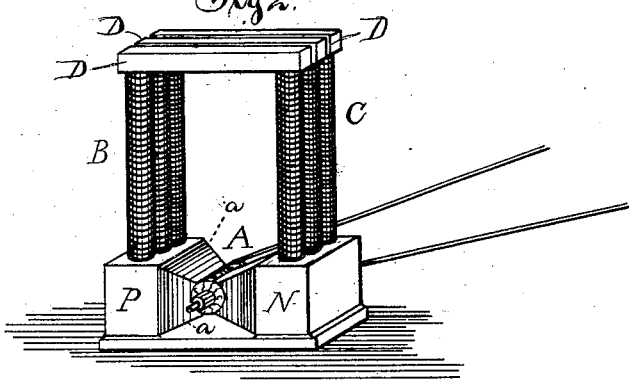
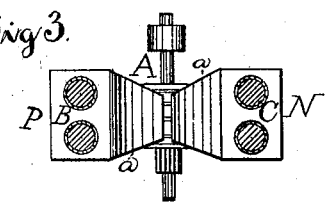
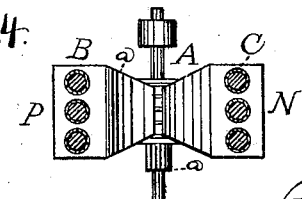
ATTEST:
E. C. Rowland
H. W. Seely
INVENTOR:
Thomas A. Edison,
By Rich'd N. Dyer
Atty.

UNITED STATES PATENT OFFICE.

THOMAS A. EDISON, OF MENLO PARK, NEW JERSEY, ASSIGNOR TO THE EDISON ELECTRIC LIGHT COMPANY, OF NEW YORK, N. Y.

DYNAMO OR MAGNETO ELECTRIC MACHINE.

SPECIFICATION forming part of Letters Patent No. 281,353, dated July 17, 1883.

Application filed September 13, 1882. (No model.)

*To all whom it may concern:*

Be it known that I, THOMAS A. EDISON, of Menlo Park, in the county of Middlesex and State of New Jersey, have invented a new and useful Improvement in Dynamo or Magneto Electric Machines, (Case No. 434;) and I do hereby declare that the following is a full and exact description of the same, reference being had to the accompanying drawings, and to the letters of reference marked thereon.

The object I have in view is such an improvement in dynamo or magneto electric machines that greater economy of construction may be secured and machines of greater efficiency obtained than heretofore for the same outlay. This I accomplish by contracting the field of force of the machines, and in this way increasing the lines of force or the strength of the lines of force per unit of surface of the armature. The armature is made to correspond in size with the active faces of the polar extensions, which nearly surround such armature. It will be seen that smaller armatures can be used, and that powerful machines may be built without the increase heretofore required in the size and cost of the armatures, and with but a small increase, comparatively, in the cost of the other parts of the machines, and also diminishing greatly the resistance of the armature. The contraction of the field of force is brought about by making the polar extensions smaller at their active opposing faces than at any other point, such polar extensions being made convergent in one or in two directions. One or more pairs of electro-magnet cores are attached to one or to each side of the polar extensions. Two or more pairs of cores are preferably thus attached to the same polar extensions, and are placed either in a horizontal or in a vertical position. Each pair of cores is provided with its separate magnetic yoke or back piece, while the polar extensions, to which all the pairs of cores are attached, are made each of one piece magnetically.

The foregoing will be better understood from the drawings, in which Figure 1 is a perspective view of a machine embodying the invention; Fig. 2, a perspective view of a somewhat different form of machine; Fig. 3, a vertical section through the cores on one side of the machine shown in Fig. 1, and Fig. 4 a horizontal section through the cores of the machine shown in Fig. 2.

A represents the revolving armature of a dynamo or magneto electric machine having a continuously-wound bobbin connected with the bars of a commutator-cylinder, as usual. This armature is supported, in the ordinary way, in the space between the opposing faces of the polar extensions P N of the field-of-force magnet or magnets. The active opposite faces of the polar extensions are curved to nearly surround the armature, which is made of proper size to fit in the chamber formed by the curved faces at the reduced ends of the polar extensions. These polar extensions have their bodies made of the proper size to receive the magnet-cores, while from these bodies the polar extensions are made convergent in one or two directions, or are contracted toward the field of force, the bevel surfaces being shown at *a*. This contraction may be made in one or in two directions, and from one or both sides of the polar extensions—that is to say, each polar extension may be beveled on one or both sides, or on one or both ends; or it may be beveled on one or both sides and on one or both ends at the same time. Two or more pairs of cores, B C, are preferably used, arranged on each side of the polar extensions, Fig. 1, or on one side only, Fig. 2, and connected with the bodies of the polar extensions. Each pair of cores has a separate magnetic yoke or back piece, D, as shown, while the polar extensions P N are magnetically each in one piece.

The armature, it will be seen, is made the size of the contracted ends or active faces of the polar extensions, and thus it can be made much smaller than heretofore, and, being the most expensive portion of the machine to construct, the machine is made cheaper than those of equal power heretofore constructed. It is evident that machines constructed in this way have corresponding advantages when used as electric engines or motors.

I do not claim herein the two or more cores or sets of cores attached to the same polar extensions and located at different distances from the armature, as this is claimed in my application No. 71,757; and it is to be understood that all other patentable features of invention shown or described but not claimed herein are reserved for protection by other patents, and have been or will be embodied in other applications for patents.

What I claim is—

1. In a dynamo or magneto electric machine, the combination, with a revolving armature, of the field-magnet provided with convergent polar extensions nearly surrounding the armature, substantially as set forth.

2. In a dynamo or magneto electric machine, the combination, with the field-magnet and its polar extensions having reduced opposite active ends made with curved faces, of an armature revolving in the space formed by the curved faces of the reduced active ends of the polar extensions, and nearly surrounded by such curved faces, substantially as set forth.

3. In a dynamo or magneto electric machine, the combination, with a revolving armature, of a field electro-magnet composed of polar extensions, each of which is magnetically in one piece, and two or more pairs of wound cores attached to such polar extensions, and provided with magnetically-separate yokes or back pieces, substantially as set forth.

4. In a dynamo or magneto electric machine, the combination, with a revolving armature, of the field-magnet provided with convergent polar extensions nearly surrounding the armature, and two or more pairs of magnet-cores, substantially as set forth.

5. In a dynamo or magneto electric machine, the combination, with a revolving armature, of the field-magnet provided with convergent polar extensions made each in one piece magnetically and nearly surrounding the armature, and with two or more pairs of magnet-cores having separate magnetic yokes or back pieces, substantially as set forth.

This specification signed and witnessed this 3d day of June, 1882.

THOS. A. EDISON.

Witnesses:
RICHD. N. DYER,
H. W. SEELY.